(12) United States Patent
Koetz

(10) Patent No.: US 10,182,680 B2
(45) Date of Patent: Jan. 22, 2019

(54) ELECTRICALLY OPERATED FOOD PROCESSOR

(71) Applicant: Vorwerk & Co. Interholding GmbH, Wuppertal (DE)

(72) Inventor: Hendrik Koetz, Wetter (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 65 days.

(21) Appl. No.: 15/286,800

(22) Filed: Oct. 6, 2016

(65) Prior Publication Data

US 2017/0099984 A1    Apr. 13, 2017

(30) Foreign Application Priority Data

Oct. 9, 2015  (EP) ..................................... 15189134

(51) Int. Cl.
| A47J 43/04 | (2006.01) |
| A47J 36/00 | (2006.01) |
| A47J 43/046 | (2006.01) |
| A23N 1/02 | (2006.01) |
| A47J 43/07 | (2006.01) |
| A47J 19/02 | (2006.01) |

(52) U.S. Cl.
CPC ................ *A47J 36/00* (2013.01); *A23N 1/02* (2013.01); *A47J 43/04* (2013.01); *A47J 43/046* (2013.01); *A47J 43/0716* (2013.01); *A47J 19/027* (2013.01)

(58) Field of Classification Search
CPC .......... A23N 1/02; A47J 19/027; A47J 43/046

USPC ................... 99/510, 511, 512, 513, 423, 417
See application file for complete search history.

(56) References Cited

U.S. PATENT DOCUMENTS

| 5,275,094 | A | * | 1/1994 | Naft | A47J 36/20 |
| | | | | | 126/369 |
| 5,794,524 | A | * | 8/1998 | Kemker | A47J 27/04 |
| | | | | | 126/369 |
| 6,640,692 | B1 | * | 11/2003 | Hilgers | A47J 27/004 |
| | | | | | 366/144 |
| 7,322,281 | B2 | * | 1/2008 | Kim | A23C 11/103 |
| | | | | | 99/282 |
| 8,028,617 | B2 | * | 10/2011 | Wang | A47J 43/0727 |
| | | | | | 99/357 |
| 2002/0124737 | A1 | * | 9/2002 | Bedetti | A47J 43/28 |
| | | | | | 99/342 |
| 2005/0223906 | A1 | * | 10/2005 | Xu | A47J 27/004 |
| | | | | | 99/348 |

(Continued)

FOREIGN PATENT DOCUMENTS

DE    20 2011 050 875 U1    12/2012

*Primary Examiner* — Reginald L Alexander
(74) *Attorney, Agent, or Firm* — Collard & Roe, P.C.

(57) ABSTRACT

The invention relates to an electrically operated food processor (1) for preparing a cooked product, which exhibits a basic unit (14), a vessel (2) with an agitator (18) that can be inserted into the basic unit (14), a heating device (9) allocated to the vessel (2), a temperature sensor (5), a transceiver device (12) for communicating with the temperature sensor (5), and an evaluator (13) for evaluating the measurement data received from the temperature sensor (5). In order to provide an electric food processor (1) with an alternative connection between the temperature sensor (5) and evaluator (13), it is proposed that the temperature sensor (5) be a surface acoustic wave sensor (SAW sensor).

1 Claim, 5 Drawing Sheets

(56) References Cited

U.S. PATENT DOCUMENTS

2013/0305933 A1* 11/2013 Heidrich ................ A47J 27/62
99/331

* cited by examiner

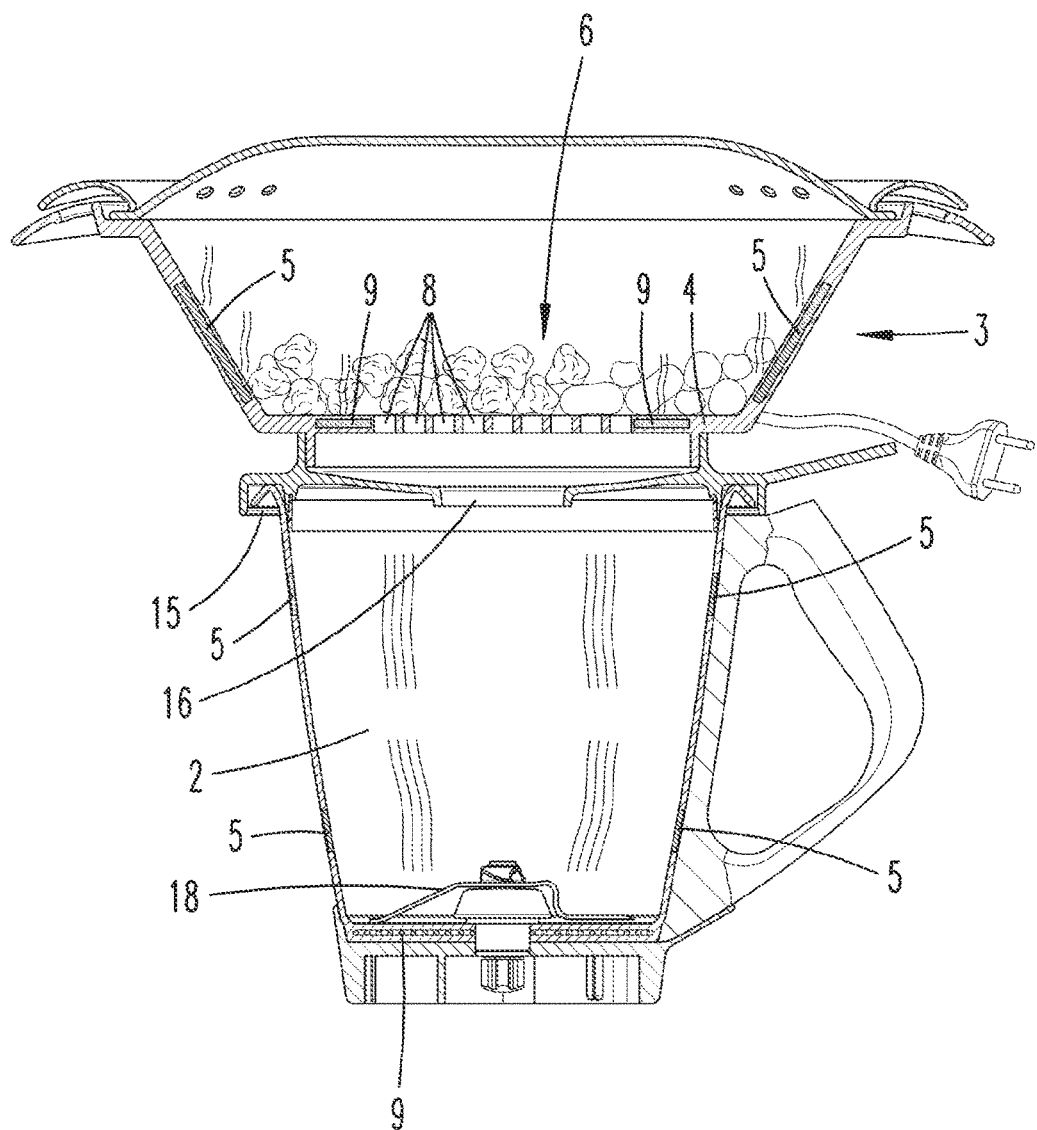

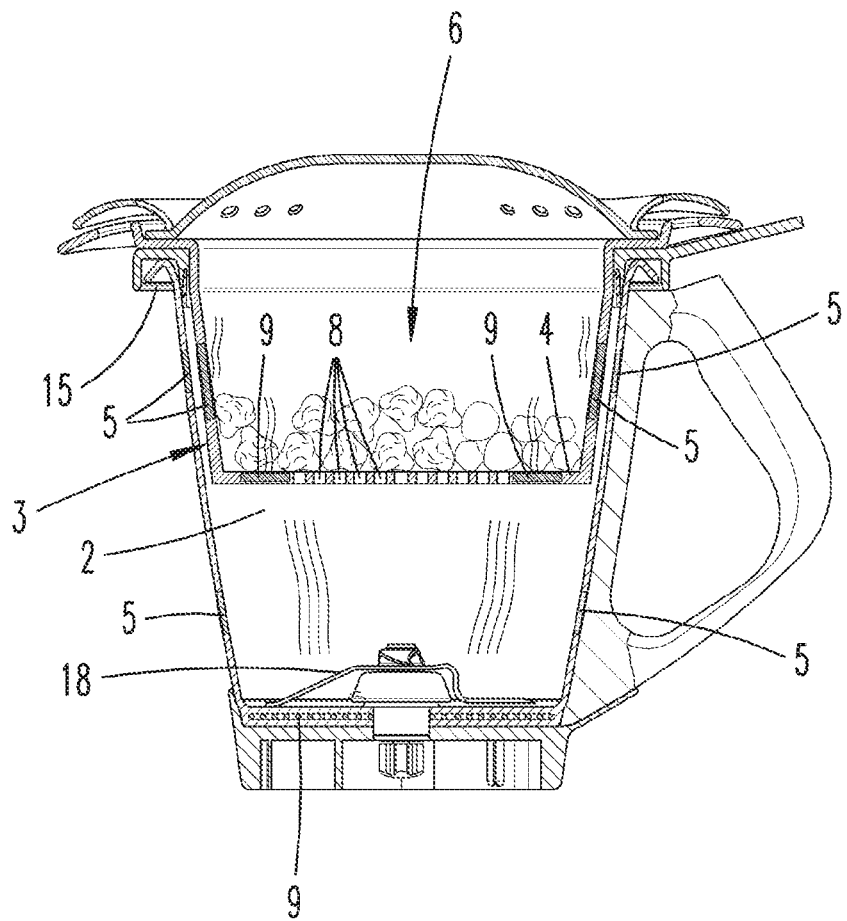

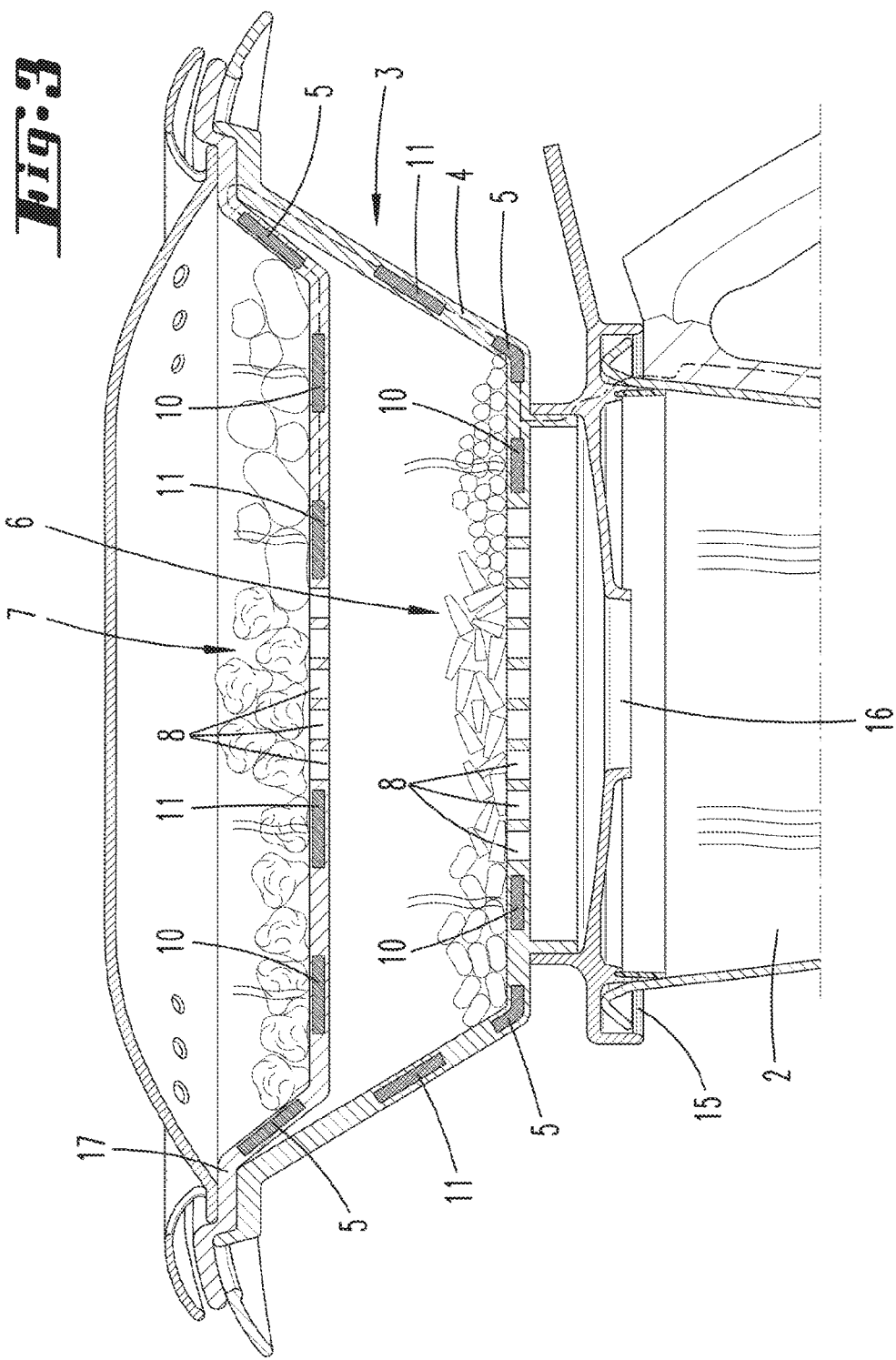

ELECTRICALLY OPERATED FOOD PROCESSOR

Applicant claims priority under 35 U.S.C. § 119 of European Application No. 15189134.8 filed on Oct. 9, 2015, the disclosure of which is incorporated by reference.

TECHNICAL FIELD

The invention initially relates to an electrically operated food processor, in particular to a cooker-mixer, for preparing a cooked product, which exhibits a basic unit, a vessel with an agitator that can be inserted into the basic unit, a heating device allocated to the vessel, a temperature sensor, a transceiver device for communicating with the temperature sensor, and an evaluator for evaluating the measurement data received from the temperature sensor.

The invention further relates to a cooking container, in particular to a cooking attachment and/or cooking insert, for a heatable vessel of a food processor, wherein the cooking container exhibits one or more floor openings, through which steam exiting the vessel can enter the cooking container, and condensate from the cooking container can flow into the vessel.

In addition, the invention relates to a method for operating a food processor, in particular a cooker-mixer.

PRIOR ART

Food processors of the aforementioned type are known in prior art.

For example, publication DE 20 2011 050 875 U1 discloses such an electrical food processor with a heatable mixing vessel, which incorporates an agitator, wherein the floor of the heating vessel can be heated with a heating device, and wherein several temperature sensors for acquiring the temperature of a cooked product present in the mixing vessel are arranged in the mixing vessel wall. The temperature sensors are designed as NTC elements, which are connected with an evaluator by means of electrical cables.

SUMMARY OF THE INVENTION

Proceeding from the above, the object of the invention is to create an electric food processor with an alternative connection between the temperature sensor and evaluator.

In order to achieve the aforementioned object, the invention proposes that the temperature sensor be a surface acoustic wave sensor (SAW sensor).

According to the invention, the temperature sensor is now a surface acoustic wave sensor (SAW sensor), which enables a wireless temperature measurement based on surface acoustic waves. Such a wireless temperature sensor communicates with a transceiver that is spatially separated from the temperature sensor, and can be part of the evaluator and/or communicate with the evaluator. The temperature sensor exhibits an integrated antenna, wherein the transceiver also exhibits an antenna, and is advantageously integrated into the food processor, which accommodates the heatable vessel. The wireless temperature measurement feature makes it especially easy to separate or remove the temperature sensor from the food processor.

It is further proposed that the temperature sensor be situated in and/or on an element of the food processor that can be spatially varied relative to the basic unit, in particular the vessel and/or a cooking container that can be situated on and/or in the vessel and/or a spatula for manipulating the cooked product. Designing the temperature sensor as a SAW sensor now makes it especially easy to situate the latter on spatially variable elements of the food processor, i.e., on elements that can be separated or removed from the basic unit, for example for cleaning purposes. This includes the heatable vessel itself on the one hand, and on the other any required accessories used, for example a cooking container, a spatula for manipulating the cooked product or the like.

Cooking containers, for example cooking attachments or cooking inserts, are sufficiently known in prior art. The floor area of the cooking container usually exhibits partial perforations, through which steam from the vessel can enter the cooking container. Condensate forming inside of the cooking container can in turn flow through the perforations into the vessel. If necessary, the cooking container can be sealed by a cover.

Another spatially variable element of the food processor is a spatula, for example, which can be used for introducing ingredients into the vessel. In addition, the spatula can also be used to manually stir the cooked product or the like. Within the meaning of the invention, additional locally variable elements of the food processor are also conceivable, which are usually designed or provided for coming into contact with the cooked product. When the spatially variable element comes into contact with the cooked product, the temperature sensor situated in or on the spatially variable element automatically also comes into indirect or direct (thermal) contact with the cooked product, thereby enabling a reliable temperature measurement.

It is further proposed that the electrically operated food processor exhibit at least two temperature sensors, which are situated in and/or on various elements of the food processor, in particular in cooking zones of the vessel and/or cooking container that exhibit different temperatures. Since the heating device of the electrically operated food processor is usually allocated to the floor area of the vessel, a characteristic temperature distribution arises inside of the vessel and potentially the cooking container, wherein areas (cooking zones) with a higher or lower temperature come about. According to the invention, temperature sensors are now used in the same or different cooking zones of the vessel or cooking container. For this purpose, the temperature sensors can be situated not just on different partial areas of the same spatially variable element of the food processor, but rather also in and/or on different spatially variable elements of the food processor, for example specifically on a wall of the vessel on the one hand, and on the other hand on a spatula, or also on the spatula and on a cover of the vessel, etc. A plurality of different combinations is here conceivable. It is recommended in particular that the temperature sensors be used in various cooking zones. Based on the measurement data measured by the temperature sensors, the heating device can be operated in such a way that as homogenous a temperature distribution as possible comes about inside of the vessel or cooking container.

Apart from the electrically operated food processor discussed above, the invention also proposes a cooking container, in particular a cooking attachment and/or a cooking insert, for a heatable vessel of a food processor, wherein the cooking container exhibits one or more floor openings, through which steam exiting the vessel can enter into the cooking container, and condensate can flow from the cooking container into the vessel, wherein the cooking container exhibits a temperature sensor, in particular a surface acoustic wave sensor (SAW sensor). This configuration now makes it possible to measure the temperature of the cooking container and/or the cooked product contained therein. As a consequence, the cooking process and/or cooking quality can be determined especially informatively, and used for the continued treatment of the cooked product. For example, the determined temperature can be used for regulating the heating device of the heatable vessel, so that various cooked products can be optimally stored, and a recipe to be prepared succeeds optimally.

It is proposed that the temperature sensor be situated in or on a wall of the cooking container. The temperature sensor can thus be situated either on a surface of the cooking container, for example adhesively bonded to the wall, or embedded into the material of the cooking container, so that the temperature sensor either does not protrude over the contour of the cooking container, or alternatively is situated as a protruding temperature element, so that the latter extends into the cooked product, for example like a bar. For example, if the cooking container is made out of a plastic, the temperature sensor can be embedded into the material of the cooking container, i.e., be completely enveloped by the plastic. In particular plastic injection processes are suitable in this regard. If the temperature sensor is a SAW sensor, the latter is advantageously likewise embedded in a plastic. However, it is alternatively also possible to position the temperature sensor freely in the cooked product, for example immerse it into the cooked product or lay it on the surface of the cooked product. A plurality of temperature sensors can advantageously be provided inside of the cooking container, wherein the latter are advantageously uniformly distributed over the volume of the cooked product, and overall measure both the temperature on the cooked product surface and the temperature inside of the cooked product. This makes it possible to ensure a homogeneous temperature distribution inside of the cooked product, which not least also results in a successful preparation of the cooked product.

It is proposed that the cooking container exhibit a plurality of cooking zones, wherein each cooking zone has allocated to it its own temperature sensor. For example, the cooking zones can differ in terms of their position inside of the cooking container. For example, a first cooking zone can be formed in a central volume region of the cooking container, while a second cooking zone lies directly against a wall of the cooking container. The cooking zones can differ in terms of the cooking zone temperature that results at a prescribed steam temperature or the arising cooking zone temperature range, wherein a cooking zone lying close to the floor openings in the cooking container routinely exhibits a higher temperature than a cooking zone located further away from it. In addition, the cooking container can also exhibit a cooking container insert, which forms an additional shelf on which cooked product can also be situated. The cooking container insert here comprises a first cooking zone, for example, while the remaining region of the cooking container forms a second cooking zone. The steam rising from a heatable vessel of a food processor first penetrates through the cooked product situated in the second cooking zone, and then through the cooked product situated in the first cooking zone. In this regard, the second cooking zone usually exhibits a higher temperature than the first cooking zone, so that it is recommended that only cooked products to be heated slightly be placed in the cooking container insert. Success in preparing the cooked products situated in the cooking container can be evaluated based on the measurement data recorded by the temperature sensors. Depending on the latter, additional preparation steps can be determined, for example mixing or rearranging cooked product, increasing the temperature of a heating device allocated to the heatable vessel or the like.

Therefore, it is proposed in particular that the cooking zones exhibit varying distances from the floor openings of the cooking container. For example, this can be achieved by forming them in the area of a wall of the cooking container or directly in the area of the floor openings. The cooking zones can merge smoothly into each other or be separated from each other, for example by ribs, bars, walls or the like. In addition, different cooking zones can also be formed in the direction of the steam rising out of the heatable vessel through the cooking container in several stages one over the other, for example by means of a cooking container insert of the kind described above inside of the cooking container.

It is further proposed that the cooking container exhibit a heating device that heats independently of the steam exiting the vessel. The cooking container thus has its own heating device, so that the cooked product to be prepared in the cooking container is not or not exclusively heated by steam rising out of the heatable vessel of the food processor. As a consequence, it is possible to specifically control the temperature of the cooking container, and hence in particular also of the cooked product, or especially advantageously to regulate the latter based on the temperature measured by the temperature sensor. In an especially advantageous way, this yields a cooking container that exhibits both a heating device and a temperature sensor, which checks the result of a heating process and again initiates an adjustment of the heating capacity or heating duration of the heating device as needed. As a consequence, the cooking container can only be heated by the steam of the heatable vessel in one embodiment. The entire cooking container and potentially the different cooking zones contained therein are here heated by means of a central heating element. By contrast, a specific adjustment of the temperature inside of the cooking container, and hence also inside of the cooked product, can also be achieved according to another embodiment during the operation of one or more heating devices of the cooking container. As opposed to exposure to steam, the function of the heating device of the cooking container is also independent of a specific orientation of the cooking container relative to the heatable vessel.

Both the heating device and temperature sensor can be situated in varying positions in or on the cooking container, so that even cooked product located a distance away from the heatable vessel can be heated just as fast as the cooked product located in proximity to the heatable vessel. Because the heating device operates independently of the steam exiting the vessel, the cooking process inside of the cooking container can already begin when a liquid contained in the heatable vessel is not yet boiling, so that no steam gets into the cooking container either. As a consequence, the heating device makes the cooking container independent of steam formation inside of the vessel. The heating device not least also makes it possible to use the cooking container as an actively heat retaining container. The cooking container can here also be used by itself, completely independently of a food processor or its heatable vessel. This in particular in combination with the temperature sensor according to the invention, and especially advantageously with a control circuit that contains the temperature sensor and heating device.

It is proposed that the heating device exhibit a plurality of partial heating devices, which in particular are situated in different cooking zones of the cooking container. The partial heating devices can here be located at defined distances in or on the wall of the cooking container, thereby yielding a homogeneous heating of the cooked product present in the cooking container. The partial heating devices can here advantageously form different cooking zones of the cooking container, for example also be provided on a cooking container insert of the cooking container. Each cooking zone here advantageously exhibits its own temperature sensor and its own partial heating device, so that the temperature can be controlled and/or regulated separately in each cooking zone, and monitored by the respective temperature sensor. Just as with the temperature sensor, the heating device or partial heating device can be situated in or on the wall of the cooking container. For example, the partial heating devices can be provided in the wall around a circle or along a strip. The latter are advantageously embedded into the material of the wall, thereby eliminating the possibility of contact with the cooked product to be prepared.

Finally, the invention also proposes a method for operating a food processor, in particular a cooker-mixer, for preparing a cooked product, wherein at least two temperatures, in particular temperatures of a cooked product to be prepared, are measured at positions deviating from each other by means of at least two temperature sensors situated in and/or on elements of the food processor that are spatially variable relative to the basic unit, and wherein at least one partial heating device of a plurality of partial heating devices of a heating device situated in the food processor is operated as a function of the determined current temperatures.

Therefore, the invention proposes a method for operating the food processor with a temperature regulating method as a function of at least two measured temperatures. For example, when measuring a cooked product temperature at a first position that lies below the temperature of a second position, the heating capacity of the heating device can be raised or lowered accordingly, so that the temperature values come to approximate each other. The heating device is here advantageously operated at an elevated temperature or with a longer heating duration in relation to a partial heating device allocated to the first position.

In a preferred embodiment, the method further provides that a transceiver device be formed on the basic unit, which transmits an electromagnetic excitation signal, wherein the temperature sensor transmits a temperature-dependent response signal, and the transceiver device receives the response signal, wherein the current temperature is determined by comparing the response signal [with] the temperature-dependent reference signal.

As a consequence, the measuring method preferably advantageously makes use of temperature-dependent surface waves, which are excited in the temperature sensor, and can be measured on the surface of the temperature sensor. The temperature sensor is here excited to oscillate by high-frequency electromagnetic waves, wherein the temperature of the cooked product can be derived based upon the temperature dependence of the electromagnetic waves sent back by the temperature sensor. The high-frequency electromagnetic waves are transmitted to the temperature sensor via the transceiver device. The waves sent back by the temperature sensor as a response signal are subsequently received by the transceiver device, and relayed to the evaluator of the basic unit of the food processor. In order to derive the cooked product temperature as precisely as possible from the received signals, a definable frequency band is advantageously traversed per temperature measurement, i.e., per measurement run. Based on the frequency-dependent signal intensities of the received response signals, the resonance frequency can then be determined, and the cooked product temperature can in turn be derived from the latter. The determined cooked product temperature can subsequently be sent by the evaluator to a display of the basic unit of the food processor and displayed there. Alternatively and/or additionally, the determined cooked product temperature can also be used for regulating a cooking process inside of the cooking container as described in the invention. Regulating the current temperature inside of the cooking container here enables a recipe preparation that has been optimized with respect to the currently measured temperature from the standpoint that the duration of heat exposure and/or intensity of heat exposure are retroactively influenced as a function of the temperature, for example. On the one hand, a heating device situated in the vessel, for example a heating plate situated on the vessel floor, can here be used to increase or decrease the heating capacity in the vessel, so as to achieve an increase or decrease in temperature inside of the cooking container as well. Alternatively and/or additionally, however, use can also be made of a heating device situated in the cooking container itself, or of one of several partial heating devices, in particular so as to bring about an increase or decrease in temperature in defined cooking zones of the cooking container.

Even though a new temperature measurement can basically be performed with the use of wired temperature sensors, the invention preferably proposes that the transceiver device communicate wirelessly with SAW sensors.

BRIEF DESCRIPTION OF THE DRAWINGS

The invention will be explained in more detail below based on exemplary embodiments. Shown on:

FIG. 2a is a sectional view of the partial area of the vessel with temperature sensors in the vessel;

FIG. 2b is a sectional view of a partial area of the vessel with temperature sensors in another cooking container in the vessel;

FIG. 3 is a sectional view of a partial area of the vessel with a cooking container situated thereon according to a second embodiment.

DESCRIPTION OF THE EMBODIMENTS

Figure 1:
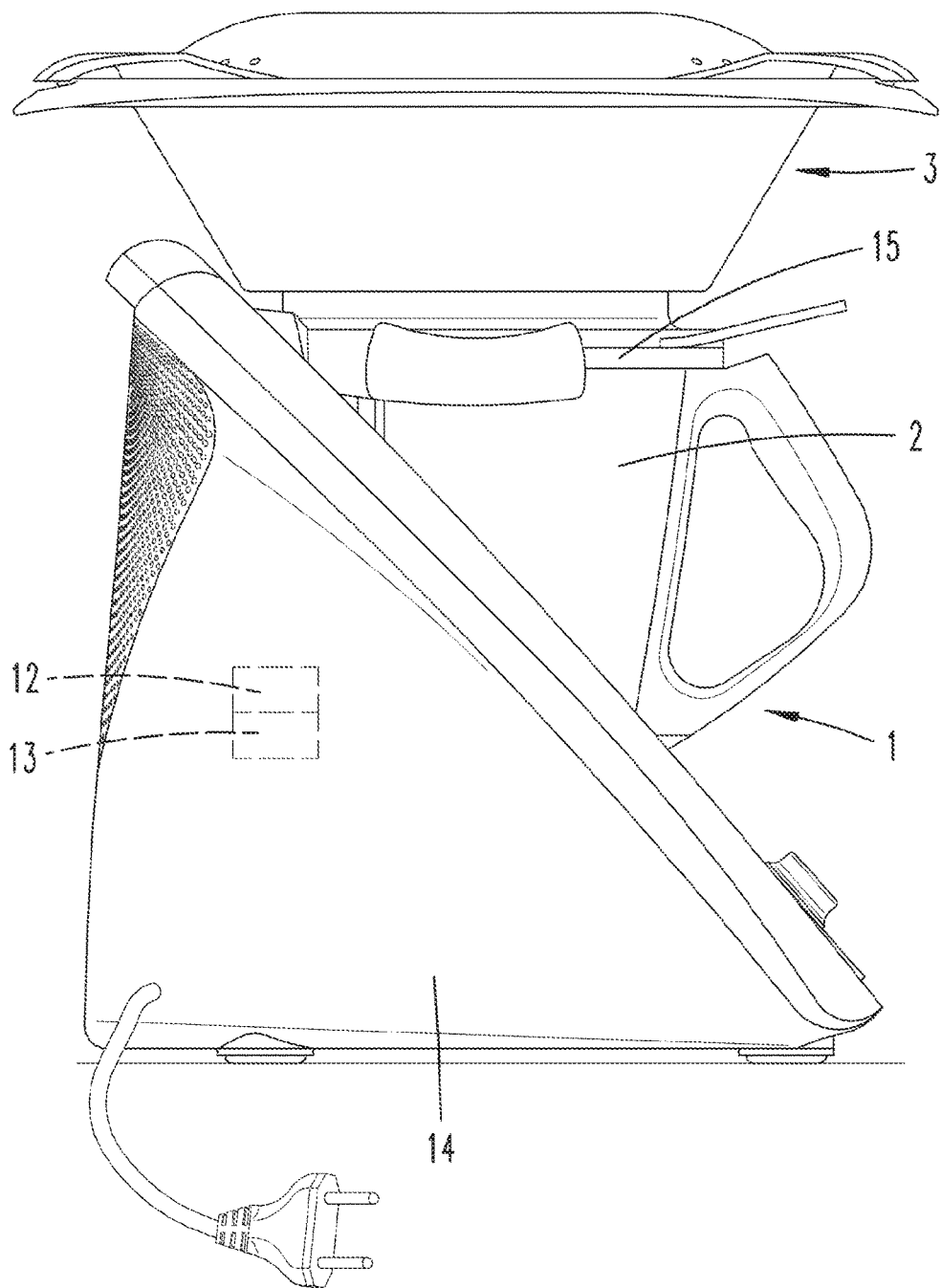
FIG. 1 is a food processor with a vessel and a cooking container situated thereon.

FIG. 1 shows a food processor 1, which here is designed as a cooker-mixer, for example. The food processor 1 exhibits a basic unit 14 along with a vessel 2 incorporated therein (here: mixing vessel) with an agitator 18 and a vessel cover 15. The vessel cover 15 has a central cover opening 16, through which steam generated in the vessel 2 can flow into a cooking container 3 situated on the vessel 2. The vessel 2 of the food processor 1 has allocated to it a heating device 9 (see FIG. 2) for heating the vessel 2. An agitator is also potentially situated in the vessel 2. The food processor 1 further exhibits a transceiver device 12 as well as an evaluator 13. Both are allocated to the basic unit 14 of the food processor 1.

The cooking container 3 is here designed as a cooking attachment that can be placed on the vessel 2. The cooking container 3 is sealed with a cover, which potentially exhibits openings that allow steam to escape.

Figure 2:
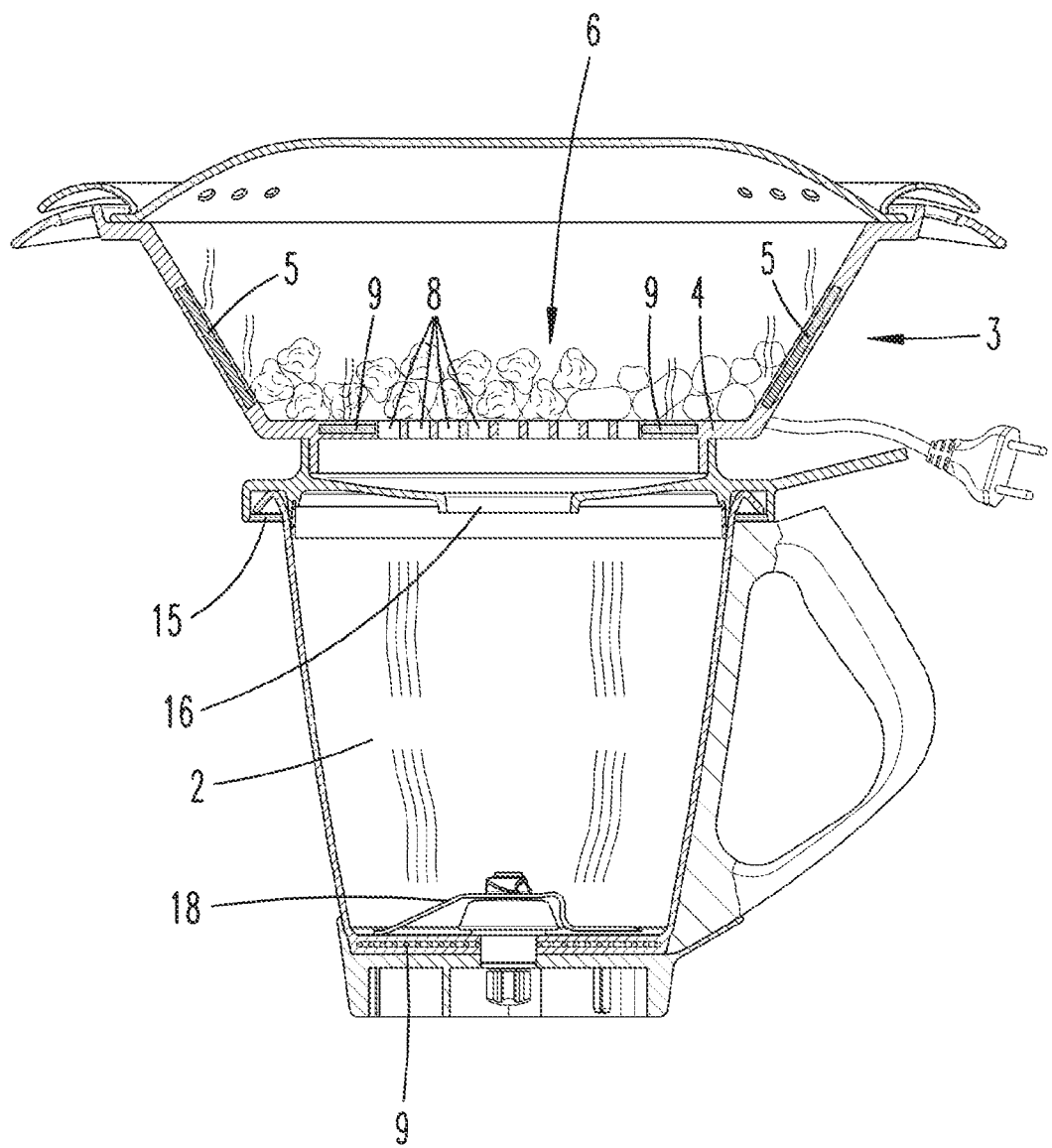
FIG. 2 is a sectional view of a partial area of the vessel with a cooking container situated thereon according to a first embodiment.

The cross section depicted on FIG. 2 shows an upper partial area of the vessel 2 with the vessel cover 15 as well as the cooking container 3. The vessel cover 15 seals the vessel 2 at least partially, wherein the central cover opening 16 is formed on the vessel cover 15, through which steam can flow out of the vessel 2 into the cooking container 3.

The cooking container 3 exhibits a wall 4 that borders a cooking zone 6, and incorporates several temperature sensors 5. Formed in a floor area of the cooking container 3 is a heating device 9, which is annularly situated around the cover opening 16 of the vessel cover 15. For example, the heating device 9 can be an electrical resistance heater with individual resistance elements. The temperature sensors 5 are here designed as SAW sensors, which can communicate wirelessly by radio with the transceiver device 12 of the basic unit 4 of the food processor 1. To supply power to the heating device 9 of the cooking container 3, the latter has a network connection for supplying voltage to the heating device 9. Even though the cooking container 3 has its own mains plug in the exemplary embodiments shown, the heating device 9 can alternatively also be supplied with voltage via the basic unit 14 of the food processor 1. If the cooking container 3 has a separate voltage supply as depicted, the cooking container 3 can also be used as a standalone device, so that the latter can also be used independently of the food processor 1 and/or the heatable vessel 2. In alternative embodiments shown in FIGS. 2a and 2b, the temperature sensors 5 can also be incorporated into the vessel 2 and/or into a cooking container 3 disposed in the vessel 2.

FIG. 3 shows a second embodiment, in which the cooking container 3 exhibits a cooking container insert 17 in the form of a shelf, which exhibits several temperature sensors 5 and several (specifically two here) partial heating devices 10, 11. The partial heating devices 10, 11 are each concentrically situated around floor openings 8 formed in the cooking container insert 17. The cooking container 3 and cooking container insert 17 are supplied with voltage via the basic unit 14 of the food processor 1. To this end, the basic unit 14, vessel 2, vessel cover 15 and wall 4 of the cooking container 3 or cooking container insert 17 exhibit electrical lines. Corresponding electrical contacts for ensuring the supply of electricity are situated at the interfaces between the food processor 1 and vessel 2, vessel 2 and vessel cover 15, vessel cover 15 and cooking container 3 or cooking container 3 and cooking container insert 14. The temperature sensors 5 and partial heating devices 10, 11 are each embedded into the wall 4 of the cooking container 3 or cooking container insert 17. The interior of the cooking container insert 17 or the interior of the cooking container 3 each comprise a cooking zone 6, 7 for cooked product contained therein.

The invention functions in such a way that the user of the food processor 1 fills the vessel 2 with a liquid, for example water, and seals it with the vessel cover 15. The cooking container 3 is situated on the vessel cover 15. Cooked product to be cooked is introduced into the cooking container 3. The cooking container 3 is sealed with a cover. If necessary, one or more cooking container inserts 17 (see FIG. 3) can additionally be introduced into the cooking container 3, thereby forming several levels inside of the cooking container 3.

The liquid contained in the vessel 2 is heated by means of the heating device 9 allocated to the vessel 2. As soon as the boiling point of the liquid has been reached, steam rises from the vessel 2 and escapes through the cover openings 16 into the cooking container 3 or cooking container insert 17. The wall 4 of the cooking container 3 or cooking container insert 17 is here heated, along with the cooked products situated in the cooking container 3 or cooking container insert 17. In addition, the heating device 9 of the cooking container 3 (FIG. 2) or the partial heating devices 10, 11 of the cooking container 3 and cooking container insert 17 (FIG. 3) can already be used for the supplemental heating of the cooked product at this point in time already.

The partial heating devices 10, 11 according to FIG. 3 can here be controlled independently of each other, so that different cooking zones can be formed inside of the cooking container 3 or cooking container insert 17. For example, the partial heating device 10 of the cooking container insert 17, which is located farther away from the floor openings 8 than the partial heating device 11, can be operated at a higher temperature, so that cooked product situated in the cooking container insert 17 is uniformly heated, regardless of the radial distance of the cooked product relative to the floor openings 8 through which the hot steam of the vessel 2 flows. In like manner, the partial heating devices 10, 11 of the cooking container insert 17 can be operated at a higher temperature than the partial heating device 10 of the cooking container 3, through which the hot steam initially flows before finally penetrating into the cooking container insert 17. As a result, a uniform temperature can be achieved both in the cooking container insert 17 and the cooking container 3 itself, so that similar cooked products are exposed to the same temperature. Alternatively, however, a temperature different than the one in the cooking zone 6 of the cooking container 3 can be set in the cooking zone 7 of the cooking container insert 17, for example. In addition, additional levels, e.g., cooking zones 6, 7, with varying temperatures can also be formed in the cooking container insert 17 or remaining area of the cooking container 3. A different type of cooked product can then be situated in each of these cooking zones 6, 7, for example fish inside a first cooking zone 6 and vegetables in a second cooking zone 7. Due to the plurality of cooking zones 6, 7, the cooked products contained in the cooking container 3 or cooking container insert 17 can be fully cooked by the same point in time, even given characteristics that deviate from each other.

The respective current temperature inside of the different cooking zones 6, 7 is measured by means of the respective temperature sensors 5 situated there. In the examples shown here with SAW sensors as the temperature sensors 5, the transceiver device 12 of the basic unit 14 transmits an excitation signal to the temperature sensors 5. The temperature sensors 5 have a component structure that exhibits a temperature-dependent resonance frequency, i.e., amplifies a specific frequency as a function of temperature. The transceiver device 12 here transmits a plurality of excitation signals with deviating frequencies of a defined frequency band in chronological sequence. The frequencies are tailored to the component structure of the temperature sensors 5, as well as to the expected temperatures. Each temperature sensor 5 here exhibits a frequency range that deviates from the other temperature sensors 5, so that the transmitted measurement data can be allocated to a specific temperature sensor 5.

Each excitation signal of the transceiver device 12 triggers a specific response signal in the respective temperature sensor 5, so that the temperature sensor 5 sends a temperature-dependent response signal back to the transceiver device 12. Since not all frequencies are uniformly amplified within the component structure of the respective temperature sensor 5 as a function of the current temperature of the cooked product in the area of a temperature sensor 5, the signal intensity of the response signal can be used to determine the temperature which the cooked product situated there currently exhibits. The response signals received by the transceiver device 12 are relayed to the evaluator 13, and there compared with temperature-dependent reference frequencies. If an excitation signal of the transceiver device 12 corresponds with a resonance frequency of the respective temperature sensor 5 at a current temperature, the signal intensity of this response signal is higher than the signal intensities of the response signals relative to frequencies deviating from the latter. The response signals received by the transceiver device 12 from the respective temperature sensor 5 are hence analyzed with respect to the response signal with the highest signal intensity, so that the temperature currently present at the respective temperature sensor can be reliably determined. The higher the number of excitation signals within the defined frequency band, the more informative the measuring result. The currently determined temperatures can subsequently be compared with the temperatures desired for preparing the cooked product. If a deviation is found, for example too low a temperature in the area of the cooking zone 7 of the cooking container insert 17, the partial heating devices 10 and/or 11 are set to a higher heating capacity, so as to reach the desired temperature value. In addition, the temperature sensors 5 here keep continuously measuring the temperature. This results in a control circuit in which the temperature of the partial heating devices 10, 11 or even the partial heating device 9 of the vessel 2 or cooking container 3 is regulated as a function of the determined temperature difference between the current temperature measured by the temperature sensor and the desired temperature. As a consequence, the heating capacity and/or heating duration can be used for successful recipe preparation. This in particular by raising/lowering the intensity of heat exposure and/or duration of heat exposure.

The heating device 9 or partial heating devices 10, 11 are turned on and off automatically by a controller of the food processor 1, for example by the evaluator 13. As a consequence, the heating device 9 or partial heating devices 10, 11 can be automatically operated as a function of a current preparation stage in a recipe and the measurement data of the temperature sensors 5. Even though not depicted on the figures, the invention can of course also function in such a way that only the heating device 9 of the vessel 2 is operated, and only its heating capacity or heating duration is regulated as a function of the measurement result of the temperature sensors 5 of the cooking container 3 or cooking container insert 17. As a result, either the heating device 9 of the vessel 2 can be used as a central heating device, or alternatively a plurality of partial heating devices 10, 11 can be provided, which are advantageously situated directly in the cooking zones 6, 7.

Even though the invention was illustrated primarily as relates to temperature sensors situated on the cooking container, i.e., the cooking attachment, it is of course also possible to situate the temperature sensors in the sense of the invention on the vessel of the food processor and/or other spatially variable elements of the food processor, for example a spatula for manipulating the cooked product. Of course, temperature sensors can also be simultaneously situated on the vessel, cooking container and/or spatula or on other accessories. Each of the proposed spatially variable elements can here exhibit either just a single temperature sensor or also several temperature sensors at the same time.

REFERENCE LIST

1 Food processor
2 Vessel
3 Cooking container
4 Wall
5 Temperature sensor
6 Cooking zone
7 Cooking zone
8 Floor opening
9 Heating device
10 Partial heating device
11 Partial heating device
12 Transceiver device
13 Evaluator
14 Basic unit
15 Vessel cover
16 Cover opening
17 Cooking container insert
18 Agitator

The invention claimed is:
1. An electrically operated food processor (1) for preparing a cooked product, comprising:
 a basic unit (14),
 a vessel (2) that can be inserted into the basic unit (14),
 a cooking, container (3) that is configured to be placed in or on the vessel,
 a heating device (9) connected to the vessel (2),
 an agitator connected to the vessel,
 a plurality of temperature sensors (5),
 a transceiver device (12) for communicating with the temperature sensors (5), and
 an evaluator (13) for evaluating measurement data received from the temperature sensors (5),
 wherein the temperature sensors are surface acoustic wave sensors (SAW sensors),
 wherein at least one of the vessel and cooking container has cooking zones that exhibit different temperatures, and wherein at least two of said temperature sensors are situated in the cooking zones that exhibit different temperatures.

* * * * *